United States Patent [19]
Everson et al.

[11] Patent Number: 5,168,567
[45] Date of Patent: Dec. 1, 1992

[54] DATA SORTING CIRCUIT

[75] Inventors: Dennis D. Everson, Banks; Philip R. Lantz, Cornelius; Stanley R. Koslowski, Tualatin, all of Oreg.

[73] Assignee: Tektronix, Inc., Wilsonville, Oreg.

[21] Appl. No.: 358,216

[22] Filed: May 30, 1989

[51] Int. Cl.[5] .............................................. G06F 7/22
[52] U.S. Cl. ............................. 395/700; 364/DIG. 1; 364/222.9; 364/252; 364/259.2
[58] Field of Search ... 364/200 MS File, 900 MS File; 395/575, 650, 700

[56] References Cited

U.S. PATENT DOCUMENTS

| | | | |
|---|---|---|---|
| 3,815,083 | 6/1974 | Dirks et al. | 364/200 |
| 4,425,617 | 1/1984 | Sherwood | 364/200 |
| 4,475,237 | 10/1984 | Glasby | 382/10 |
| 4,692,897 | 9/1987 | Crabbe | 364/900 |
| 4,774,681 | 9/1988 | Frisch | 364/554 |
| 4,809,158 | 2/1989 | McCauley | 364/200 |
| 4,991,134 | 2/1991 | Ivsin | 364/900 |

OTHER PUBLICATIONS

Baron & Shapiro, Data Structures and Their Implementation, 1980, pp. 130-186.

*Primary Examiner*—Thomas M. Heckler
*Attorney, Agent, or Firm*—Boulden G. Griffith

[57] ABSTRACT

A circuit for software performance analysis implements a balanced binary tree in hardware. This circuit consists of a number of "levels", each containing two (sets of) latches, a RAM, and a digital comparator. One of the latches, the data latch, is used to hold the data element being evaluated. The other latch, the results latch, stores partial results based on the comparisons performed on higher levels. The RAM is addressed by the contents of the results latch on the preceding level in combination with the output of the comparator on that same preceding level. The output of the RAM is compared by the digital comparator with the contents of the data latch, to produce an additional bit of results information for the next level. On each level, the RAM is preprogrammed with twice as many midpoint addresses as is the RAM on the preceding level. The outcome of the comparison done on any particular level is used, along with the results from preceding levels, as an address to access a RAM on the next level. Eventually, the last level is reached and there is only one range for each address generated on that level. This address is then applied to a count-holding RAM, and the contents of that RAM at that location is incremented to indicate that the incoming data element was within this data range.

3 Claims, 1 Drawing Sheet

DATA SORTING CIRCUIT

BACKGROUND OF THE INVENTION

This invention relates to the field of digital data sorting circuits and techniques, and more particularly to the field of data sorting circuits used to accomplish software performance analysis by counting the occurrence of address calls within a large number of address ranges of varying sizes.

In analyzing the performance of a computer system as it executes a program, it is frequently desirable to be able to count the occurrence of each of a variety of different digital patterns as rapidly as possible with a minimum of hardware. For example, it may be desirable to be able to determine the amount of time that the program spends within different address ranges as it is executed. With such a capability, it may be possible to improve the efficiency of a program by analyzing how much time the program spends within each subroutine as the program is executed and making appropriate enhancements to eliminate unnecessary inefficiencies in those parts of the program that are most frequently invoked.

Prior art efforts to provide this sort of resource have included a variety of approaches. If the results do not need to be immediately available or perfectly accurate, a statistical, non-real-time approach can be effectively used. The address (or other) data present on the bus of a microprocessor can be stored at regular sample intervals. During the time between samples, the last sample data element can be compared by software with the address ranges of interest and a counter incremented to reflect the result. Such an approach is described in co-pending U.S. patent application by Clark et al., Ser. No. 06/812,085, abandoned. While the method described in that application will work for a large number of ranges and requires only a minimum of dedicated hardware, the non-real-time, statistical nature of the result is unsuitable for many applications.

Another approach, but one which is much more hardware intensive, is to dedicate a word recognizer and a counter to the task of recognizing each individual pattern and counting its occurrences. However, for a large number of such patterns, this is prohibitively expensive, since additional circuitry is required for each pattern of interest. Moreover, because each address or data pattern is monitored separately, the counts for each address in a range of addresses have to be added together to produce a total for the whole range.

This approach can be made somewhat more efficient by using only one counter to do all of the counting but storing separate sums for each different pattern. Such a technique is described in a paper by Steven Kerman, entitled: *A Facility for Analyzing Microprocessor System Performance*, published in the Digest of Papers, IEEE Compcon, 1979. In this system, a large number of counters are simulated by one counter and a random access memory. During the occurrence of each event the counter counts clock pulses and its concluding count is added to a stored value in memory. The same adder is successively employed to update many different memory locations. While this approach is more effective than a multiplicity of counters, it is still unnecessarily hardware intensive and inefficient because individual addresses are being monitored and the results summed to produce results for a range of addresses.

An improvement to this approach is disclosed in U.S Pat. No. 4,774,681 to Frish for a "Method and Apparatus for Providing a Histogram", Sep. 27, 1988. Frish improved on the method of Kerman by eliminating the adder and substituting a linear feedback shift register for the conventional counter. By eliminating the adder, significant time savings are made possible, increasing the maximum speed of operation attainable. Similarly, the substitution of the linear feedback shift register for the conventional counter also produces some time savings. However, this is still the same basic approach, and it still suffers from the problem of having to sum the individual address counts in order to obtain a count of the occurrence of data elements over an entire range of addresses or other data elements.

If only a coarse binning of data is required, the approaches just discussed can be applied only to higher order bits of the data and results obtained for the symmetrical ranges of lower order data that each of these then represent. It is, however, frequently desirable, especially when monitoring program execution during software performance analysis, to be able to define non-symmetrical data ranges. Such non-symmetrical definitions are necessary, for example, to monitor the time spent within different subroutines of varying sizes. One way to monitor non-symmetrical address ranges is to dedicate a number of programmable range recognizers, such as those disclosed in "Programmable Range Recognizer for a "Logic Analyzer", U.S. Pat. No. 4,475,237 to Glasby, and count the occurrences of their output signals. A somewhat similar approach to range recognition is shown in U.S. Pat. No. 4,692,897 for an "Arrangement for Dynamic Range Checking or Matching for Digital Values in a Software System". Both of these approaches, however, require proportionally increased hardware resources to monitor a large number of address ranges.

What is desired is a way of accomplishing software performance analysis that operates rapidly to count each occurrence of data elements within each of a large number of data ranges, including data ranges of arbitrary size, and that requires a proportionally decreasing amount of dedicated hardware resources as the number of data ranges to be monitored is increased.

SUMMARY OF THE INVENTION

The present invention is a circuit for accomplishing software performance analysis that operates rapidly to count each occurrence of data elements within each of a large number of data ranges, including those of arbitrary size, and that requires only a linearly increasing amount of hardware to monitor an exponentially increasing number of data ranges of interest.

This circuit employs hardware to implement a balanced binary tree approach to sorting the incoming stream of data elements into any arbitrary set of data ranges in relative real-time. The overall circuit consists of a number of "levels", each of which contains two sets of latches, a RAM, and a digital comparator. The digital comparator compares data elements to values from the RAM in order to make decisions in the balance binary tree. One of the (sets of) latches, the data latch, is used to hold the data element presently being evaluated by this level. The other latch, the results latch, stores partial results based on comparisons performed on higher levels. The RAM is addressed by the contents of the results latch on the preceding level in combination with the output of the comparator on that same (preceding)

level. The output of the RAM is compared by the digital comparator with the contents of the data latch, to produce an additional bit of results information for use by the next level.

On each level, the RAM is preprogrammed with twice as many midpoint addresses as is the RAM on the preceding level. The outcome of the comparison done on any particular level is used, along with the results from preceding levels, as an address to access a RAM on the next level. Eventually, the last level is reached and there is only one range for each address generated on that level. This address is then applied to a count-holding RAM, and the contents of that RAM at that location is incremented to indicate that the incoming data element was within that particular data range.

BRIEF DESCRIPTION OF THE DRAWINGS

THE FIGURE is a simplified schematic diagram of a circuit according to the present invention with three "levels"shown.

DETAILED DESCRIPTION

Figure 1:
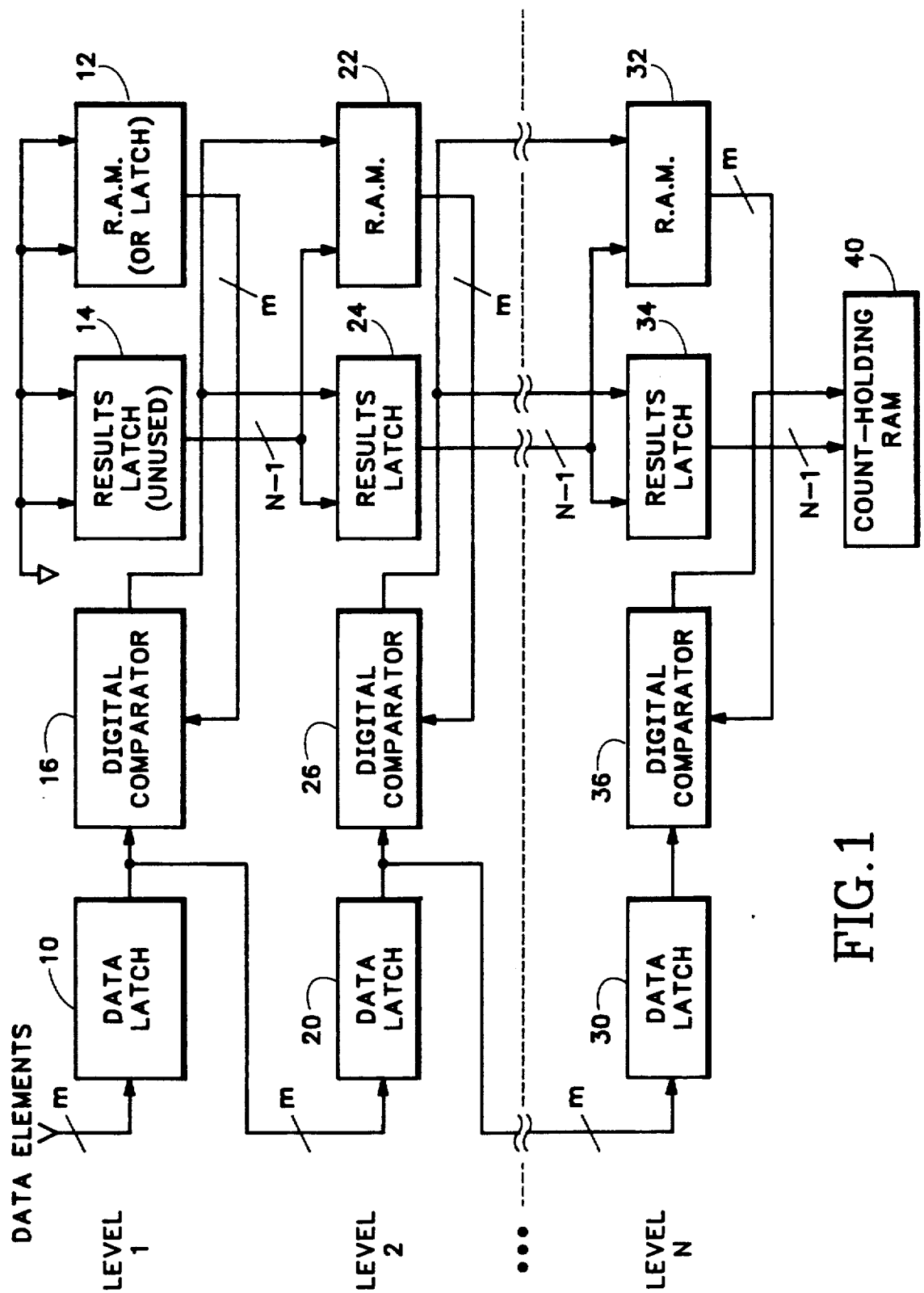

Referring to the Figure, the circuit of the present invention consists of a number of "levels", each containing two (sets of) latches 10,14, a RAM 12, and a digital comparator 16. The number of levels employed depends on the number of data ranges desired, such that $R = 2 \wedge N$, where R is the number of ranges made available and N is the number of levels. Each level makes a single decision that narrows the set of ranges within which the data element may reside. This approach assumes that the data ranges are contiguous, i.e., that there are no gaps between ranges, and that the incoming data lies within the range of the overall set of ranges.

To preprogram this circuit, the set of data ranges (e.g., address regions) into which the data elements (e.g., specific address calls) are to be sorted is repeatedly divided in half, to produce a balanced binary tree of data ranges. The RAMs of each level in this circuit are then preprogrammed with comparison values based on this binary tree of data ranges. For example, suppose that the addresses on a bus can range from 0000 to 1111, for a total of 16 possibilities, and that there are eight address ranges of interest: 0000, 0001-0011, 0100, 0101-0110, 0111, 1000, 1001-1110, and 1111. The first decision point in a balanced binary tree of these address ranges is 0111, since there are four ranges at or above this value and four ranges below it. If an incoming data element is first compared with this value and found to be equal to or greater than it, that element must be in the higher four of these ranges. If this data element is then compared with 1001 (the midpoint of the upper set of ranges), and found to be equal to or greater than this number, it must be in the range 1001-1110 or the range 1111. Finally, if this same data element is tested against 1111 and found to be less than this number, it must be in the range 1001-1110.

Performing the foregoing procedure in software and the random access memory of a general purpose computer is not new. What is new, and is the subject matter of this invention, is a particular hardware circuit that allows this procedure to be accomplished rapidly, locally, and without occupying the activities of a microprocessor. A microprocessor is used to preprogram the RAMs in each level of the circuit, supplying them with decision point information based on the range selections made by an operator.

On each level, the RAM is preprogrammed with twice as many midpoint addresses as is the RAM on the preceding level. Thus, the one or zero outcome of the comparison done on the first level is used as an address to access a RAM on the second level containing two items of data, one for the midpoint of the group of data ranges above the original midpoint and the other for the midpoint of the data ranges below the original midpoint. The result of the comparison on the second level is used along with the stored result of the comparison performed on the first level, to select an address from the RAM on the third level. The RAM on the third level contains four addresses, one for each of the midpoints of the four sets of data ranges into which the previous two steps have divided the original set of ranges.

Using the numbers from the simple example given above, the RAM 12 on the first level would be preprogrammed with the value 0111. The RAM 22 on the next level would be preprogrammed with the values 0100 and 1001, representing the next two decision points in the balanced binary tree. And, in this three level example, the third level RAM 32 would be preprogrammed with 0001, 0101, 1000, and 1111, representing the final four decision points in the tree.

In a circuit with more levels, the activity on each succeeding level is similar, with the current comparison and all past comparisons being used to identify the next value selected from the RAM for comparison. On each level there are twice as many bins of ranges as on the preceding level, until the level is reached at which the number of such bins is equal to the total number of ranges and there is only one range in each bin. The address resulting from this final comparison is then applied to a count-holding RAM 40, and the contents of that RAM at the addressed location is incremented to indicate that the incoming data element was within this data range.

Upon the occurrence of each synchronizing clock signal, the data element stored in the data latch on every level is latched into the data latch on the next level. Also, the contents of the results latch on each level, as well as the result of the present comparison on that same level, are latched into the results latch of the next level. Thus, as the analysis of a particular data element passes from one level to the next, a new data element arrives on the prior level for further sorting on that level. Consequently, when a circuit containing a total of N levels has been operating for N or more clock cycles, the sorting of N different data elements is proceeding at any one time, with a different data element being sorted on each level. Accordingly, the analysis for a particular data element is completed N + 1 clock cycles after that data element first appears at the input of the first level.

Referring now in detail to the Figure, an incoming data element to be sorted is first latched into the data latch 10 on level 1 by the first clock signal after it is present. This data element may be of any width "m". First level RAM 12 only contains one value, also of width "m". The value in RAM 12 is chosen to be at the center of the set of ranges that the incoming data elements are to be sorted into, as described above.

Because there is only one value in this RAM 12, its address inputs are tied to a constant value or values suitable for causing this one piece of data to be addressed. Similarly, since this is the first level, there is no preceding level, and so the inputs to the results latch 14 are all tied to a source of a logical "0". Obviously, the results latch 14 and RAM 12 on this first level are under-utilized. The RAM 12 could be replaced with a latch, and the results latch 14 is completely superfluous. These circuit elements are shown this way because, by using an array of similar cells in an IC, it is easier to make all of the levels the same than it is to customize one of them, especially if a large number of levels are going to be required.

The digital comparator 16 on the first level compares the data element in data latch 10 with the value output by RAM 12 and produces an output bit which is applied to the least significant bit of the input to the results latch 24 and RAM 22 of the next level. The results latch 24 and the RAM 22 on this level also receive at their inputs the output of the results latch 14 on the preceding level, but left-shifted by one bit (i.e., multiplied by two). Actually, which direction, if any the bits are physically shifted is unimportant. What is necessary is that the resulting address on each successive level be one bit longer than on the preceding level. Here, since the results latch 14 on the preceding first level always contains all zeros, the contents of this results latch 24 and the address applied to the RAM 22 on this level are always either a "0" or a "1".

Upon the occurrence of the next clock signal, the data element in the data latch 10 on the first level is latched into the data latch 20 on the second level, and a new data element replaces the old one in the data latch 10 on the first level.

RAM 22 on the second level contains two values. Using the example above again, these two values would be 0100 and 1001, representing the middle of the two sets of ranges into which the value in first RAM 12 divided the set of ranges. A "0" from the digital comparator 16 on the first level will address the 0100 value, while a "1" from the first level comparison will address the 1001 value.

One clock cycle after a new data element is clocked into the data latch 10 on the first level, that same data element is latched into the data latch 20 on the second level. The digital comparator 26 on the second level compares the selected output of the RAM 22 on the second level with the data element currently stored in the data latch 20 on this level. As on the first level, the result of this comparison is a single bit indicating how the two values compared. If the value form the data latch 20 is equal to or greater than the value from the RAM 22, the output is "1", indicating that the search for the appropriate range should be continued on the next level in the direction of higher values. Conversely, if the value from the data latch 20 is less than the value from the RAM 22, the output is a "0", indicating that the search for the appropriate range should be continued on the next level in the direction of lower values.

The RAM 32 on the third level contains four values, representing the next set of branches in the balanced binary tree. In terms of the example being used, these values would be 0001, 0101, 1000, and 1111. One of these values is selected by a combination of the bit determined on the first level and stored on the second and the bit determined on the second level by digital comparator 26. These two bits are applied to the address inputs of RAM 32 where they select one of the four values stored there for the comparison on this level. In the example being used, a "00" will select the lowest value, 0001, an "01" will select the next value, 0101, a "10" will select the third of these values, 1000, and a "11" will select the highest value, 1111.

If there are only three levels in a simple implementation of the invention, the Nth level shown in Figure is this final level. The single bit output of the digital comparator 36 and the two bits stored in the results latch 34 are combined to produce the output of the overall circuit. This output address represents the address in the count-holding RAM 40 that should now be incremented to reflect the fact that the original incoming data element was determined to be within this data range.

As has been noted above, the size of the RAM required doubles for each successive level of the overall circuit. Therefore, it is probably desirable to use discrete RAM circuit elements, even though the data latches, results latches, and digital comparators can be conveniently replicated as a set as many times as necessary on a single chip.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

We claim:

1. A circuit for sorting into a plurality of contiguous data ranges a plurality of data items arriving over time, the circuit having a plurality of levels coupled in series, the levels comprising:
   a data storage element with an input receiving a data item form a data storage element output on an immediately preceding level, the data storage element storing the data item and providing the data item as an output;
   a RAM preprogrammed with information regarding the boundaries of the plurality of contiguous data ranges and defining decision points of a binary tree, the RAM being addressed by address data from an immediately preceding level to access a stored value and supply the stored value as an output;
   a comparator coupled to compare the output of the data storage element and the output of the RAM and producing an additional address bit for a next level; and
   a results storage element with an input receiving address data from the immediately preceding level and an output providing the address data to the next level.

2. A circuit for sorting and counting a plurality of data items arriving over time, the circuit comprising:
   a first level having:
      a preprogrammed storage element containing initial decision information regarding a central boundary of a plurality of contiguous data ranges and defining a first decision point in a binary tree, the preprogrammed storage element providing the initial decision information at an output, and
      a comparator comparing a data item to the output of the preprogrammed storage element to produce an additional address bit for a next level;
   one or more intermediate levels, each having:
      a data storage element with an input receiving a data item from a data storage element output on an immediately preceding level, the data storage element storing the data item and providing the data item as an output;

a RAM preprogrammed with information regarding the boundaries of the plurality of contiguous data ranges and defining decision points of a binary tree, the RAM being addressed by address data from an immediately preceding level to access a stored value and supply the stored value as an output, the address data including the additional bit;

a comparator coupled to compare the output of the data storage element and the output of the RAM and producing an additional address bit for a next level; and a results storage element with an input receiving address data from the immediately preceding level and an output providing the address data to the next level; and means for storing and incrementing a plurality of counts, to increment a count stored at a location identified by the address data form the immediately preceding level, the address data including the additional bit, to produce an incremented stored count indicative of the number of data item occurrences within a particular data range.

3. A circuit for sorting and counting a plurality of data items arriving over time, the circuit comprising:

a first level having:

a data storage element having an input receiving a data item and storing the data item upon an occurrence of a clocking signal and producing the data item at an output;

a preprogrammed storage element containing initial decision information regarding a central boundary of a plurality of contiguous data ranges and defining a first decision point in a binary tree, the preprogrammed storage element providing the initial decision information at an output; and a comparator for comparing the output of the preprogrammed storage element and the output of the data storage element to produce an additional address bit for a next level;

one or more intermediate levels, each having:

a data storage element with an input receiving the data item from the immediately preceding level and storing the data item upon the occurrence of the clocking signal and providing the data item as an output;

a RAM preprogrammed with information regarding boundaries of the plurality of contiguous data ranges and defining decision points of a binary tree, the RAM being addressed by address data from an immediately preceding level to access a stored value and supply the stored value as an output, the address data including the additional bit;

a comparator coupled to compare the output of the data storage element and the output of the RAM and producing an additional address bit for a next level; and a results storage element with an input receiving address data from the immediately preceding level, the results storage element storing the address data upon the occurrence of the clocking signal and providing the address data to the next level; and means for storing and incrementing a plurality of counts, to increment upon the occurrence of the clocking signal a count stored at a location identified by the address data from the immediately preceding level, the address data including the additional bit, to produce an incremented stored count indicative of the number of data item occurrences within a particular data range.

* * * * *